(12) United States Patent
Lin

(10) Patent No.: US 7,029,061 B2
(45) Date of Patent: Apr. 18, 2006

(54) SUN SCREEN DEVICE

(75) Inventor: Paul Lin, Yung-Kang (TW)

(73) Assignee: Macauto Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 10/902,848

(22) Filed: Aug. 2, 2004

(65) Prior Publication Data
US 2006/0022491 A1 Feb. 2, 2006

(51) Int. Cl.
*B60J 7/06* (2006.01)
(52) U.S. Cl. .................... 296/214; 296/216.08
(58) Field of Classification Search ........... 296/216.08, 296/214; 160/370.22, 289 US
See application file for complete search history.

(56) References Cited

U.S. PATENT DOCUMENTS 6,161,893 A * 12/2000 Ewing et al. .............. 296/152

FOREIGN PATENT DOCUMENTS

| DE | 2234852 | * | 1/1974 | ............... 296/222 |
| FR | 1236301 | * | 6/1960 | ............... 296/222 |
| JP | 0263133 | * | 10/1988 | ............... 296/214 |
| JP | 175186 | * | 7/1996 | |

* cited by examiner

*Primary Examiner*—Dennis H. Pedder
(74) *Attorney, Agent, or Firm*—Foley & Lardner LLP

(57) ABSTRACT

A sun screen device includes a pair of slide rails and a screen unit. The screen unit includes a screen body, an operating member, and a pair of biasing members. The screen body has a terminating end that is movable along the slide rails. The operating member is connected to the terminating end of the screen body, and includes a pair of sliding elements, each of which is coupled slidably to a respective one of the slide rails. Each of the biasing members is associated with a respective one of the slide rails and a respective one of the sliding elements so as to bias the respective one of the sliding elements to abut slidably against the respective one of the slide rails.

3 Claims, 4 Drawing Sheets

SUN SCREEN DEVICE

BACKGROUND OF THE INVENTION

1. Field of the Invention

The invention relates to a sun screen device, more particularly to a sun screen device for an automobile.

2. Description of the Related Art

A conventional sun screen device, which is used for covering and uncovering a sunroof of an automobile, includes a pair of elongate slide rails and a screen unit. Each of the slide rails extends in a first direction, and has top and bottom walls, and a lateral wall that interconnects the top and bottom walls. The slide rails are spaced apart from each other in a second direction. The top, bottom, and lateral walls of each of the slide rails cooperatively define a rail groove. The screen unit includes a shaft unit. The shaft unit includes a pair of seat members, each of which is disposed proximate to an end of a respective one of the slide rails, and a shaft member that extends in the second direction and that has opposite shaft end portions mounted rotatably and respectively on the seat members, and a middle shaft portion between the shaft end portions of the shaft member. The screen unit further includes a flexible screen body and an operating member. The flexible screen body has a securing end that is secured to the middle shaft portion of the shaft member, and a terminating end that is opposite to the securing end and that is movable in the first direction along the slide rails. The operating member includes a pair of sliding elements, and a connecting element. Each of the sliding elements is coupled slidably and respectively to the slide rails such that each of the sliding elements is disposed slidably in the rail groove in the respective one of the slide rails. The connecting element is connected to the terminating end of the screen body and interconnects the sliding elements.

The aforementioned conventional sun screen device is disadvantageous in that gaps are present between the sliding elements and the slide rails. As such, when the automobile is in motion, vibration of the screen unit results in collisions between the sliding elements and the slide rails, which creates undesirable noise in the automobile. Moreover, collisions between the sliding elements and the slide rails also occur, which likewise create undesirable noise, when the connecting element is moved along the slide rails.

SUMMARY OF THE INVENTION

Therefore, the object of the present invention is to provide a sun screen device that can overcome the aforesaid drawbacks of the prior art.

According to the present invention, a sun screen device includes a pair of elongate slide rails and a screen unit. Each of the slide rails extends in a first direction. The slide rails are spaced apart from each other in a second direction transverse to the first direction. The screen unit includes a flexible screen body, an elongate operating member, and a pair of biasing members. The screen body has a terminating end that is movable in the first direction along the slide rails. The operating member is connected to the terminating end of the screen body, and includes a pair of sliding elements, each of which is coupled slidably to a respective one of the slide rails. Each of the biasing members is associated with a respective one of the slide rails and a respective one of the sliding elements so as to bias the respective one of the sliding elements to abut slidably against the respective one of the slide rails.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
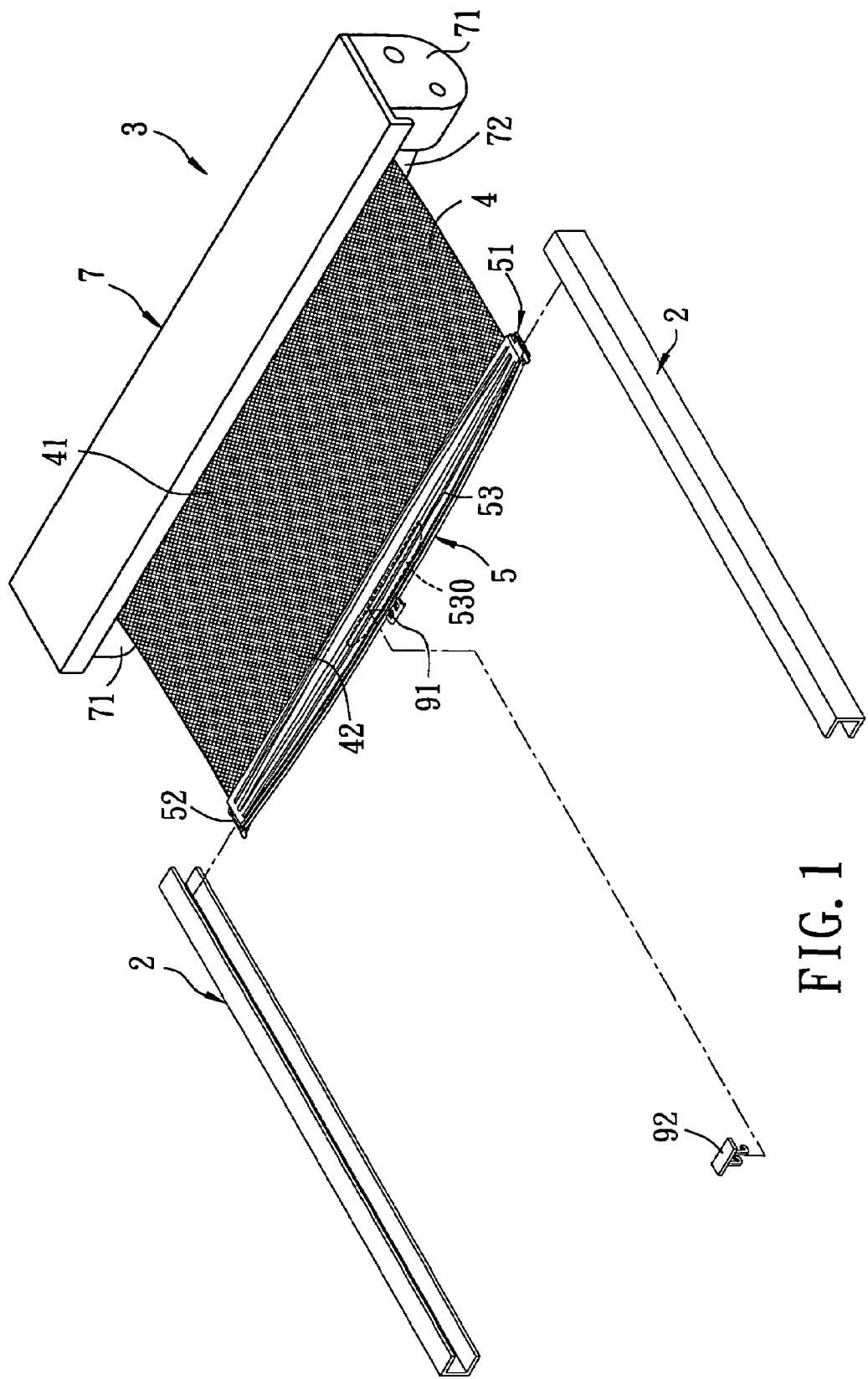
FIG. 1 is a perspective view of the preferred embodiment of a sun screen device according to the present invention.
Figure 2:
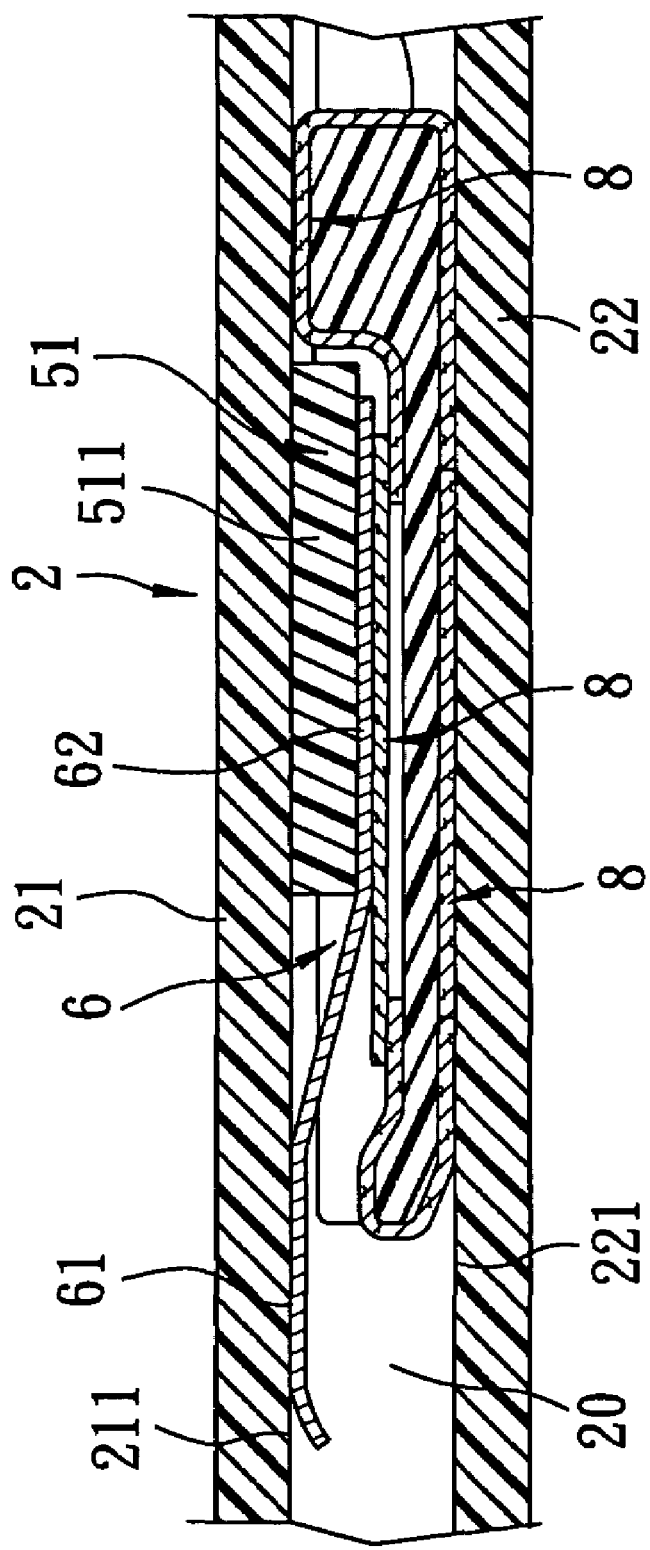
FIG. 2 is a fragmentary sectional view of the preferred embodiment to illustrate a state where a biasing member biases a sliding element toward a bottom wall of a slide rail.

Referring to FIGS. 1 and 2, the preferred embodiment of a sun screen device according to this invention is shown to include a pair of elongate slide rails 2, and a screen unit 3.

The sun screen device in this embodiment is adapted to be mounted beneath a sunroof (not shown) of an automobile, and is operable so as to block sunlight passing through the sunroof.

Figure 3:
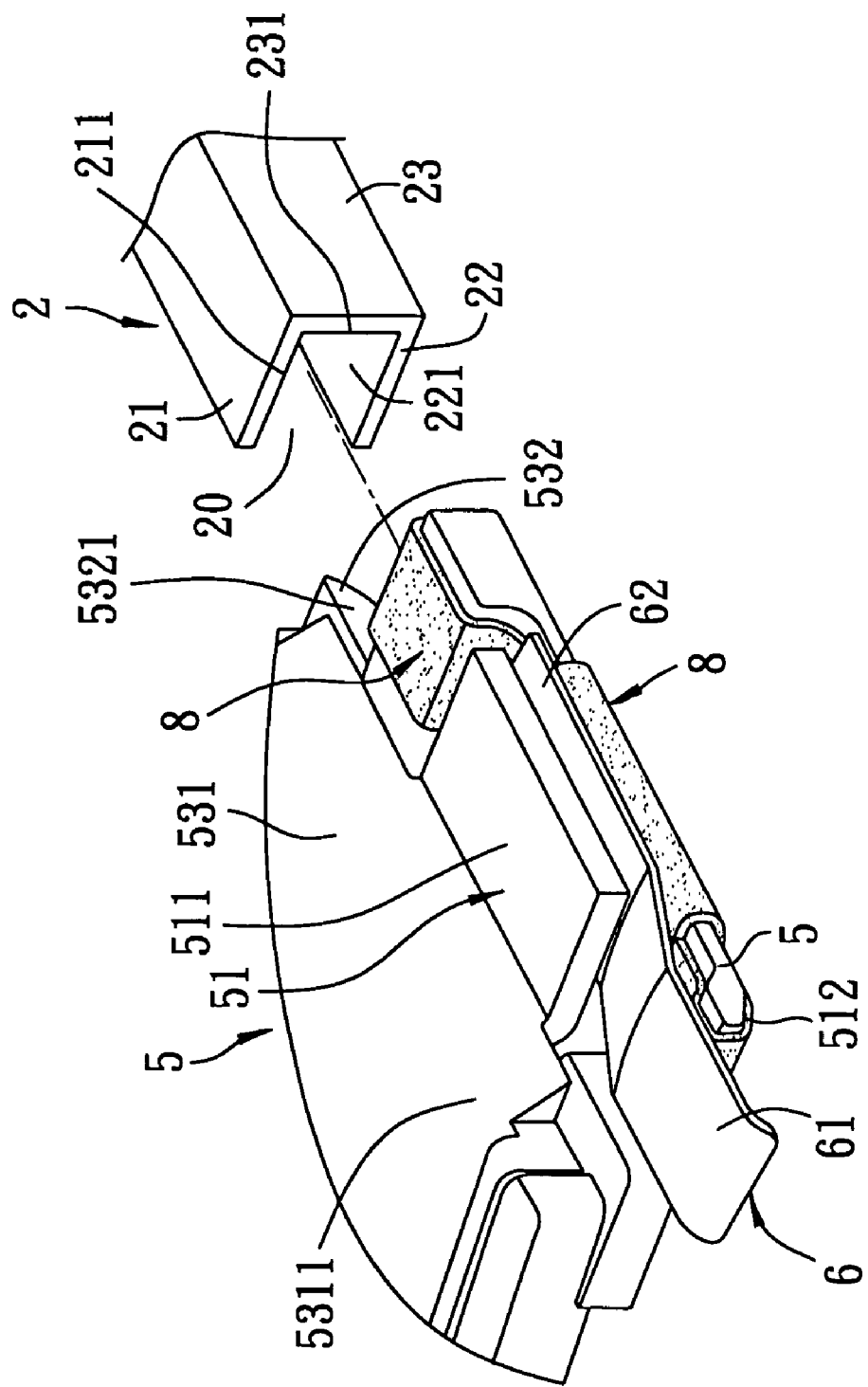
FIG. 3 is fragmentary perspective view to illustrate first and second clamp pieces of the sliding element of the preferred embodiment.

Each of the slide rails 2 extends in a first direction. The slide rails 2 are spaced apart from each other in a second direction transverse to the first direction. As best shown in FIG. 3, each of the slide rails 2 (only one of the slide rails 2 is shown) includes top and bottom walls 21, 22 opposite to each other in a third direction transverse to the first and second directions, and a lateral wall 23 that interconnects the top and bottom walls 21, 22 of a respective one of the slide rails 2. Moreover, each of the top, bottom, and lateral walls 21, 22, 23 of a respective one of the slide rails 2 has an inner wall surface 211,221,231. Further, the top, bottom, and lateral walls 21, 22, 23 of each of the slide rails 2 cooperatively define a rail groove 20.

The screen unit 3 includes a flexible screen body 4, an elongate operating member 5, and a pair of biasing members 6.

In this embodiment, the screen unit 3 further includes a shaft unit 7. The shaft unit 7 includes a pair of seat members 71, each of which is disposed proximate to an end of a respective one of the slide rails 2, and a shaft member 72 that extends in the second direction and that has opposite shaft end portions mounted rotatably and respectively on the seat members 71, and a middle shaft portion between the shaft end portions.

The screen body 4 has a securing end 41 that is secured to the middle shaft portion of the shaft member 72, and a terminating end 42 that is opposite to the securing end 41 and that is movable in the first direction along the slide rails 2.

The operating member 5 is connected to the terminating end 42 of the screen body 4. The terminating end 42 of the screen body 4 is movable relative to the slide rails 2 between a covering position, where the terminating end 42 of the screen body 4 is disposed distal from the shaft member 72 such that such that the screen body 4 is unwound from the middle shaft portion of the shaft member 72, and an uncovering position, where the terminating end 42 of the screen body 4 is disposed proximate to the shaft member 72 such that the screen body 4 is wound on the middle shaft portion of the shaft member 72, in a manner well known in the art.

In this embodiment, the operating member 5 includes first and second sliding elements 51, 52, and a connecting element 53. As best shown in FIG. 2 (only the first sliding element 51 is shown), the first and second sliding elements 51 are coupled slidably and respectively to the slide rails 2 such that each of the first and second sliding elements 51 is disposed slidably in the rail groove 20 in the respective one of the slide rails 2.

The connecting element 53 is connected to the terminating end 42 of the screen body 4, and interconnects the first and second sliding elements 51, 52. In particular, as best shown in FIG. 3, the connecting element 53 includes upper and lower connecting element parts 531, 532, each of which has first and second ends 5311, 5321 (only the first ends 5311, 5321 of the upper and lower connecting element parts 531, 532 are shown) opposite to each other in the second direction. The upper and lower connecting element parts 531, 532 are opposite to each other in the third direction. As best shown in FIGS. 2 and 3, each of the first and second sliding elements 51 (only the first sliding element 51 is shown) includes first and second clamp pieces 511, 512 that are opposite to each other in the third direction. Each of the first and second clamp pieces 511, 512 of the first sliding element 51 extends from the first end 5311, 5321 of a respective one of the upper and lower connecting element parts 531, 532. Similarly, each of the first and second clamp pieces of the second sliding element extends from the second end of a respective one of the upper and lower connecting element parts 531, 532. In this embodiment, each of the first and second sliding elements 51, 52 is made from a plastic material.

As best shown in FIGS. 2 and 3, the screen unit 3 further includes a pair of pad members 8 (only one of the pad members 8 is shown), each of which is wrapped around the second clamp piece 512 of a respective one of the first and second sliding elements 51, thereby preventing direct contact between the second clamp piece 512 of the respective one of the first and second sliding elements 51 and a respective one of the slide rails 2. In this embodiment, each of the pad members 8 is made from a non-woven fabric material.

Each of the biasing members 6 (only one is shown in FIGS. 2 and 3), is associated with a respective one of the slide rails 2 and a respective one of the first and second sliding elements 51 so as to bias the respective one of the first and second sliding elements 51 to abut slidably against the respective one of the slide rails 2. In particular, each of the biasing members 6 has a spring arm portion 61, and a connecting end portion 62 that extends from the spring arm portion 61 of a respective one of the biasing members 6. As best shown in FIG. 2, the spring arm portion 61 of each of the biasing members 6 abuts slidably and resiliently against the inner wall surface 211 of the top wall 21 of the respective one of the slide rails 2. The connecting end portion 62 of each of the biasing members 6 is connected securely to the respective one of the first and second sliding elements 51. In particular, as best shown in FIGS. 2 and 3, the connecting end portion 62 of each of the biasing members 6 is sandwiched between the first and second clamp pieces 511, 512 of the respective one of the first and second sliding elements 51. Accordingly, each of the biasing members 6 biases the second clamp piece 512, 522 of the respective one of the first and second sliding elements 51 toward the inner wall surface 221 of the bottom wall 22 of the respective one of the slide rails 2. In this embodiment, each of the biasing members 6 is made from a plastic material. In an alternative embodiment, each of the biasing members 6 is made from metal.

The operating member 5 further includes a finger-grip provided on the connecting element 53. In particular, as best shown in FIG. 1, the connecting element 53 is formed with an elongated groove 530 at a position between the sliding elements 51, 52.

Figure 4:
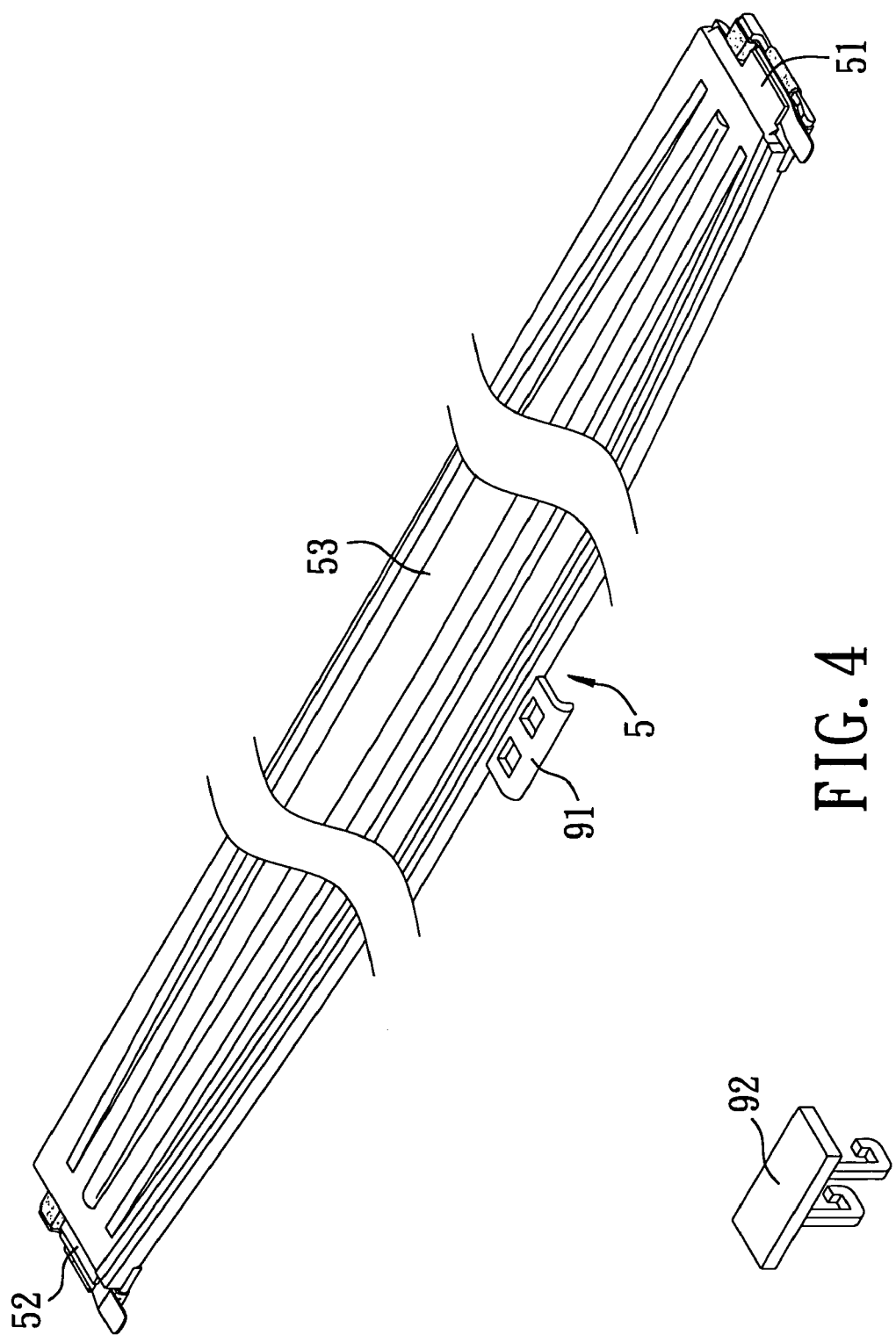
FIG. 4 is a perspective view to illustrate a fastening unit of the preferred embodiment.

Referring to FIG. 4, the sun screen device of this embodiment further includes a hook-engaging element 91 that is provided on the connecting element 53 at a position between the first and second sliding elements 51, 52, and a hook element 92 that is adapted to be mounted on the sunroof (not shown) of the automobile (not shown) and that is associated operably with the hook-engaging element 91. The hook-engaging element 91 and the hook element 92 constitute a releasable fastener unit for fastening releasably the connecting element 53 to the sunroof of the automobile so as to retain the screen body 4 at the covering position. In an alternative embodiment, the sun screen device is constructed such that the position of the terminating end 42 of the screen body 4 can be adjusted arbitrarily along the slide rails 2. As such, the hook-engaging element 91 and the hook element 92 of the fastening unit may be dispensed with.

From the above description, since each of the biasing members 6 biases the respective one of the first and second sliding members 51, 52 to abut slidably against the inner wall surface 221 of the bottom wall 22 of the respective one of the slide rails 2, and since the second clamp piece 512, 522 of each of the first and second sliding elements 51, 52, is wrapped with the respective one of the pad members 8, vibration of the screen unit 3 of the sun screen device of this invention, while the automobile is in motion, is minimized. Moreover, collisions between the second clamp pieces 512, 522 of the first and second sliding elements 51, 52 and the slide rails 2, which cause undesirable noise in the automobile, when the connecting element 53 is operated to move the terminating end 42 of the screen body 4 between the uncovering and covering positions is prevented.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

The invention claimed is:

1. A sun screen device comprising:
   a pair of elongate slide rails, each of which extends in a first direction, said slide rails being spaced apart from each other in a second direction transverse to the first direction; and
   a screen unit including:
      a flexible screen body having a terminating end that is movable in the first direction along said slide rails,
      an elongate operating member that is connected to said terminating end of said screen body, and that includes a pair of sliding elements coupled slidably and respectively to said slide rails, and
      a pair of biasing members, each of which is associated with a respective one of said slide rails and a respective one of said sliding elements so as to bias the respective one of said sliding elements to abut slidably against the respective one of said slide rails,
   wherein each of said slide rails includes top and bottom walls opposite to each other in a third direction transverse to the first and second directions, and a lateral wall that interconnects said top and bottom walls, said top, bottom, and lateral walls cooperatively defining a rail groove, each of said sliding elements being disposed slidably in said rail groove in the respective one of said slide rails, each of said biasing members being mounted on the respective one of said sliding elements, and having a spring arm portion that abuts slidably and resiliently against one of said top and bottom walls of the respective one of said slide rails so as to bias the respective one of said sliding elements toward the other of said top and bottom walls of the respective one of said slide rails, wherein each of said biasing members further has a connecting end portion that extends from said spring arm portion, and that is connected securely to the respective one of said sliding elements, wherein each of said sliding elements includes first and second clamp pieces that are opposite to each other in the third direction, said connecting end portion of each of said biasing members being sandwiched between said first and second clamp pieces of the respective one of said sliding elements, wherein said spring arm portion of each of said biasing members abuts slidably and resiliently against said top wall of the respective one of said slide rails so as to bias said second clamp piece of the respective one of said sliding elements to abut slidably against said bottom wall of the respective one of said slide rails, and wherein said screen unit includes a pair of pad members, each of which is wrapped around said second clamp piece of a respective one of said sliding elements.

2. The sun screen device as claimed in claim 1, wherein said operating member further includes a connecting element that is connected to said screen body and that interconnects said sliding elements.

3. The sun screen device as claimed in claim 2, wherein said operating member further includes a finger-grip provided on said connecting element at a position between said sliding elements.

* * * * *